(12) United States Patent
Fu et al.

(10) Patent No.: US 9,959,108 B2
(45) Date of Patent: May 1, 2018

(54) FAST DEPLOYMENT ACROSS CLOUD PLATFORMS

(71) Applicant: Pivotal Software, Inc., Palo Alto, CA (US)

(72) Inventors: Ning Fu, Beijing (CN); Xiaoming Gao, Beijing (CN); Lei Zhu, Beijing (CN); Yuan Zhao, Beijing (CN)

(73) Assignee: Pivotal Software, Inc., San Francisco, CA (US)

( * ) Notice: Subject to any disclaimer, the term of this patent is extended or adjusted under 35 U.S.C. 154(b) by 0 days. days.

(21) Appl. No.: 14/967,120

(22) Filed: Dec. 11, 2015

(65) Prior Publication Data
US 2016/0110183 A1 Apr. 21, 2016

Related U.S. Application Data

(63) Continuation of application No. PCT/CN2014/076676, filed on Apr. 30, 2014.

(51) Int. Cl.
*G06F 9/44* (2006.01)
*G06F 9/445* (2018.01)
*G06F 17/30* (2006.01)
*H04L 29/08* (2006.01)

(52) U.S. Cl.
CPC .............. *G06F 8/65* (2013.01); *G06F 8/63* (2013.01); *G06F 17/30076* (2013.01); *H04L 67/34* (2013.01)

(58) Field of Classification Search
CPC ..................................... G06F 8/63; G06F 8/65
USPC ................................................. 717/168–178
See application file for complete search history.

(56) References Cited

U.S. PATENT DOCUMENTS

| | | | | |
|---|---|---|---|---|
| 6,266,811 B1* | 7/2001 | Nabahi | ..................... | G06F 8/61 717/115 |
| 6,282,711 B1* | 8/2001 | Halpern | ................... | G06F 8/61 709/203 |
| 6,681,266 B2* | 1/2004 | Ayyagari | ................. | G06F 8/61 719/331 |

(Continued)

FOREIGN PATENT DOCUMENTS

CN 103019791 4/2013

OTHER PUBLICATIONS

Constructing and Managing Appliances for Cloud Deployments from Repositories of Reusable Components—Matthew S. Wilson; rPath, Inc. Raleigh, North Carolina—HotCloud, 2009.*

(Continued)

*Primary Examiner* — Francisco Aponte
(74) *Attorney, Agent, or Firm* — Fish & Richardson P.C.

(57) ABSTRACT

Methods, systems, and apparatus, including computer programs encoded on computer storage media, for distributed data management. One of the methods includes converting a standard specification for a software package into a custom specification for a software deployment tool that deploys the software package on one or more distributed computing systems, parsing source files and corresponding configuration files to determine configuration parameters and custom values, writing the determined configuration parameters into a custom template, and updating the custom specification with the determined custom values for the configuration parameters and information associated with the custom template.

30 Claims, 4 Drawing Sheets

(56) References Cited

U.S. PATENT DOCUMENTS

| | | | | |
|---|---|---|---|---|
| 6,854,112 B2* | 2/2005 | Crespo | ................... | G06F 8/61 707/999.202 |
| 7,047,529 B2* | 5/2006 | Delo | ................... | G06F 8/61 717/174 |
| 7,210,143 B2* | 4/2007 | Or | ................... | G06F 8/61 717/174 |
| 7,536,686 B2* | 5/2009 | Tan | ................... | G06F 8/61 713/100 |
| 7,730,480 B2* | 6/2010 | Isaacson | ................... | G06F 8/63 717/120 |
| 7,730,482 B2* | 6/2010 | Illowsky | ................... | G06F 1/3203 709/202 |
| 7,823,147 B2* | 10/2010 | Moshir | ................... | G06F 8/62 709/221 |
| 7,890,925 B1* | 2/2011 | Wyatt | ................... | G06F 9/4411 717/106 |
| 8,417,798 B2* | 4/2013 | Chen | ................... | G06F 8/38 709/203 |
| 8,458,717 B1* | 6/2013 | Keagy | ................... | G06F 8/63 718/104 |
| 8,839,234 B1* | 9/2014 | Voronkov | ................... | G06F 8/61 717/172 |
| 8,997,088 B2* | 3/2015 | Gurikar | ................... | G06F 8/61 717/168 |
| 9,674,270 B2* | 6/2017 | Konuk | ................... | H04L 67/10 |
| 2006/0037000 A1* | 2/2006 | Speeter | ................... | H04L 67/125 717/120 |
| 2006/0047798 A1* | 3/2006 | Feinleib | ................... | G06F 8/61 709/223 |
| 2006/0123414 A1* | 6/2006 | Fors | ................... | G06F 8/61 717/177 |
| 2006/0149408 A1* | 7/2006 | Speeter | ................... | G06F 8/71 700/126 |
| 2006/0184926 A1* | 8/2006 | Or | ................... | G06F 8/61 717/168 |
| 2006/0253848 A1* | 11/2006 | Mathieu | ................... | G06F 8/61 717/168 |
| 2008/0127170 A1 | 5/2008 | Goldman et al. | | |
| 2008/0320465 A1 | 12/2008 | Kinder et al. | | |
| 2011/0016464 A1* | 1/2011 | Tamura | ................... | G06F 8/60 717/175 |
| 2011/0289585 A1* | 11/2011 | Zaitsev | ................... | G06F 11/3051 726/24 |
| 2011/0296396 A1 | 12/2011 | Kurtakov | | |
| 2012/0159468 A1 | 6/2012 | Joshi et al. | | |
| 2012/0240135 A1 | 9/2012 | Risbood et al. | | |
| 2012/0266156 A1* | 10/2012 | Spivak | ................... | G06F 9/5055 717/172 |
| 2012/0266159 A1* | 10/2012 | Risbood | ................... | G06F 8/61 717/177 |
| 2012/0266168 A1* | 10/2012 | Spivak | ................... | G06F 9/5055 718/1 |
| 2012/0284704 A1* | 11/2012 | Friedman | ................... | G06F 8/61 717/177 |
| 2013/0086576 A1* | 4/2013 | Li | ................... | G06F 9/5072 717/175 |
| 2013/0159691 A1* | 6/2013 | Neuer | ................... | G06F 8/61 713/100 |
| 2014/0096128 A1 | 4/2014 | Pohlmann | | |
| 2014/0123129 A1* | 5/2014 | Risbood | ................... | G06F 9/4433 717/176 |

OTHER PUBLICATIONS

Engage: A Deployment Management System—Jeffrey Fischer, genForma Corp, USA; Rupak Majumdar, MPI-SWS, Germany; Shahram Esmaeilsabzali, MPI-SWS, Germany—PLDI'12, Jun. 11-16, 2012, Beijing, China.*

International Search Report and Written Opinion in International Application No. PCT/CN2014/076676, dated Jan. 28, 2015, 9 pages.

European Search Report for Application No. 14890911.2, dated Dec. 1, 2017, 7 pages.

* cited by examiner

FAST DEPLOYMENT ACROSS CLOUD PLATFORMS

BACKGROUND

This specification relates to cloud computing.

In cloud computing, data can be distributed to a system of multiple computers connected by one or more communications networks. Each computer can host one or more servers, each of which processes a portion of the data. The servers can process the data in parallel. Such a distributed computing system can handle web-oriented and data-intensive applications deployed in a virtualized environment. In some cases, developers deploy their software packages across multiple distributed computing systems. However, different distributed computing systems may have different underlying infrastructures, which can cause complexity for the developers deploying their software packages on the different distributed computing systems.

SUMMARY

This specification describes a technology that enables fast deployment of software packages across distributed computing systems. The technology enables users to quickly deploy software packages on different distributed computing systems that have different underlying infrastructures.

In general, one innovative aspect of the subject matter described in this specification can be embodied in methods that include the actions of obtaining, by a data processing system including one or more computers, a standard specification for a software package, the standard specification specifying a plurality of parameters for installing the software package, the software package including one or more source files specifying configuration information for installing the software package; converting, by the data processing system, the standard specification into a custom specification for a software deployment tool for deploying the software package on one or more distributed computing systems; for each of the source files, parsing, by the data processing system, the source file and a respective configuration file including one or more configuration parameters and one or more custom values for the one or more configuration parameters, to determine the one or more configuration parameters and the one or more custom values, wherein the respective configuration file specifies the configuration information; writing, by the data processing system, the determined configuration parameters into a custom template; and updating, by the data processing system, the custom specification with the determined custom values for the configuration parameters and information associated with the custom template. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The method can include installing, by the data processing system, the software package on a particular computing system running a particular operating system that is same as or substantially similar to an operating system provided by one of the distributed computing systems where the software package is to be deployed, copying, by the data processing system, the source files to the particular computing system, generating, by the data processing system, the configuration parameters based on the configuration information specified in the source files; and writing, by the data processing system, the configuration parameters into the copied source files to obtain the respective configuration files. In some implementations, the method includes receiving, for a specific configuration parameter of the configuration parameters in a specific configuration file of the respective configuration files, a specific custom value from a user, and writing, by the data processing system, the specific custom value for the specific configuration parameter into the specific configuration file. The standard specification may have an associated standard format, and the custom specification may have an associated custom format different from the standard format. Converting the standard specification into a custom specification can include parsing the standard specification to determine the plurality of parameters and associated information, and writing the determined parameters and associated information into the custom specification according to the custom format. In some cases, the method includes receiving a request from a user to convert the standard specification into the custom specification for the software deployment tool. Converting the standard specification into the custom specification may include converting the standard specification into the custom specification without any additional input from the user. In some implementations, the method includes deploying, by the data processing system, the software package on one of the distributed computing systems based on the custom template and the updated custom specification. Deploying the software package on one of the distributed computing systems can include copying the source files to the one of the distributed computing systems, identifying the configuration parameters in the custom template, determining the custom values for the configuration parameters in the updated custom specification, and writing the identified configuration parameters and the determined custom values into the copied source files to obtain new configuration files on the one of the distributed computing systems. In some examples, deploying the software package on one of the distributed computing systems includes configuring computing resources of the one of the distributed computing systems based on the updated custom specification. In some implementations, the software deployment tool is configured to deploy software packages on a plurality of different distributed computing systems, each of the different distributed computing systems including a plurality of computers and providing a respective underlying infrastructure. In a particular example, the standard specification is a Red Hat Package Manager (RPM) specification file, the custom specification comprises a BOSH specification file, and the software deployment tool is BOSH.

Particular embodiments of the subject matter described in this specification can be implemented to realize one or more advantages. Users can quickly prepare their software packages for a software deployment tool that can deploy the software packages across multiple cloud platforms. The users do not need to have prior knowledge of underlying infrastructures of the multiple cloud platforms. The users do not need to manually write or debug specification files, manifest files, and/or template files for the software deployment tool. The preparation can be faster, simpler, easier, and more accurate than manual preparation. The preparation can be automatic or with much less user input than manual preparation.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

Like reference numbers and designations in the various drawings indicate like elements.

DETAILED DESCRIPTION

Figure 1:
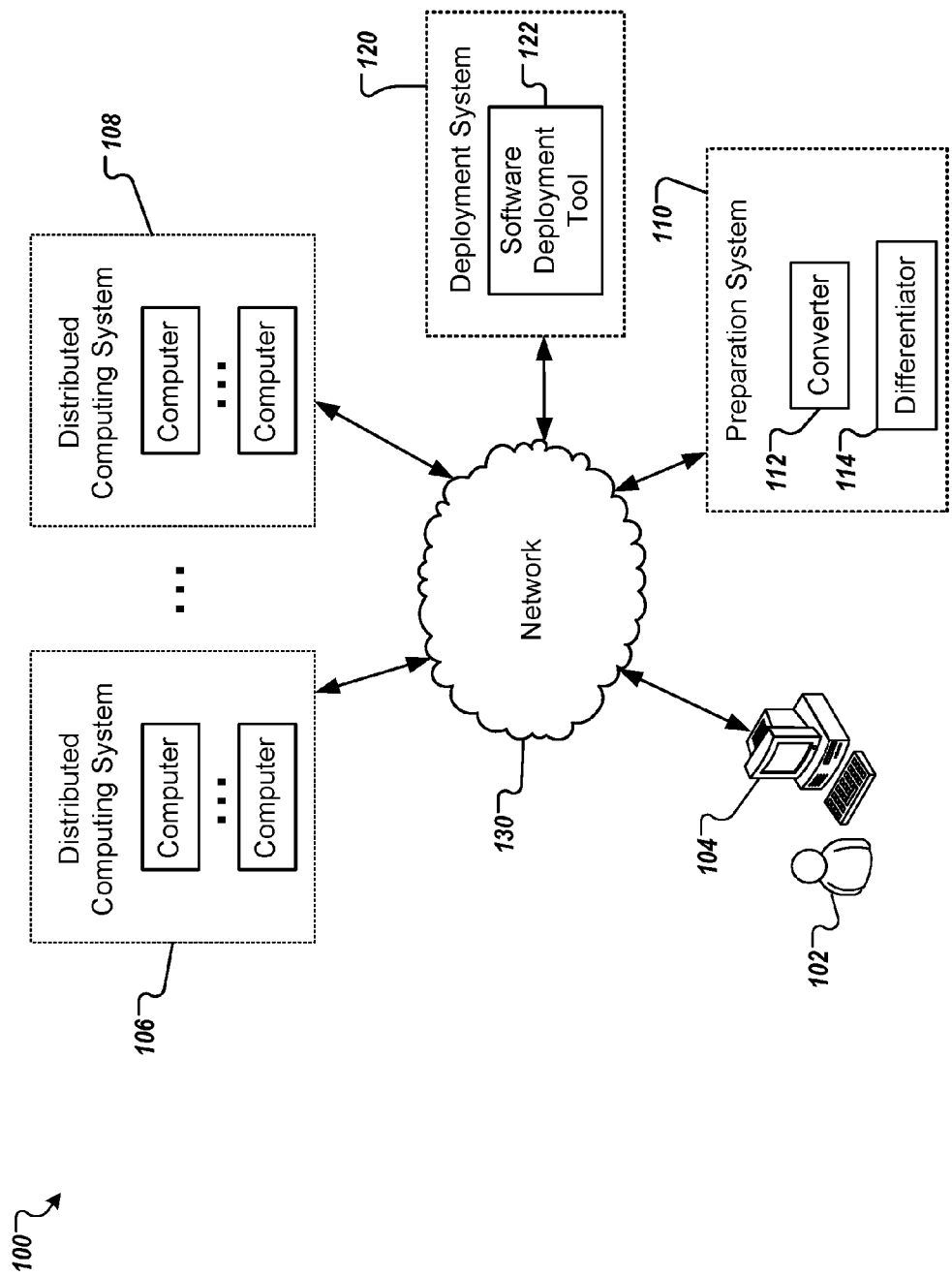
FIG. 1 is a block diagram of an example system for preparing and deploying software packages on distributed computing systems.

FIG. 1 is a block diagram of an example system 100 for preparing and deploying software packages on distributed computing systems. The example system 100 includes a user computer 104, distributed computing systems 106, 108, a preparation system 110, a deployment system 120, and a data communications network 130. A user 102 may use the user computer 104 to request deployment of a software package. The preparation system 110 can prepare the software package for deployment. The deployment system 120 can deploy the prepared software package on one or more of the distributed computing systems 106, 108.

The user computer 104, the distributed computing systems 106, 108, the preparation system 110, and the deployment system 120 communicate with one another over the data communications network 130. The data communications network 130 can include a local area network (LAN), a wide area network (WAN), the Internet, a cellular network, for example, or a combination of them, connecting any number of communication devices, computing devices, and/or server systems.

The user computer 104 can be a personal computer in the network 130 or a server computer in a server system. The user computer 104 can be any appropriate type of device, e.g., a desktop computer, a personal computer, a notebook, a tablet computing device, a personal digital assistant (PDA), a network appliance, a smart mobile phone, an enhanced general packet radio service (EGPRS) mobile phone, a media player, a navigation device, an email device, a game console, or any appropriate combination of any two or more of these computing devices or other computing devices.

The user 102 can use the user computer 104 to request deployment of a software application on one or more distributed computing systems. In some examples, the user 102 migrates the software application from one distributed computing system to another distributed computing system.

To perform installation and maintenance of the software application, a software package can be prepared for the software application. In some cases, the software package includes pre-compiled software ready for installation. In some cases, the software package includes source code files, executable binary files, and/or specific source files that specify configuration information for installing the software package.

The user 102 can use a software tool, e.g., a software package builder, to create or build the software package in the user computer 104 or in a server. One example software package builder is RED HAT® Package Manager (RPM) package builder that can build an RPM package. The software package can be installed on a target computing system running a target operating system. In some cases, the software package can be also ported to some other operating systems. For example, an RPM package created for use in RED HAT® Linux® can be also used in Linux® or Unix-like operating systems, or some other operating systems.

When the software package is installed on a computing system, the specific source files can be copied to the computing system. During installation, there may be a configuration step. The computing system can generate configuration parameters based on the configuration information in the specific source files and write the configuration parameters to the copied specific source files to obtain respective configuration files. The configuration files may be plain text files, or extensible markup language (XML) files.

During installing the software package, custom values for the configuration parameters can be obtained and written into the configuration files. In some cases, a configuration program can be executed to obtain one or more custom values. In some cases, a user can input one or more custom values. For example, the software application may require a user account, e.g., an administration account, to be set up at first before a user can use it. The user can input a user name and/or a password to set up the user account during installation.

The user 102 can use a software package manager to create a standard specification for the software package. For example, an RPM specification for an RPM package can be created with the RPM. The standard specification specifies a plurality of parameters for installing the software package. For example, the standard specification can contain a package name, version, revision number, steps to build, install, and clean a package, a change log, source code location, compiling commands, and/or installing location. The standard specification can be a text file or an XML file.

The software package can be deployed on one or more distributed computing systems 106, 108. The distributed computing systems 106, 108 can each include multiple computers connected by one or more communications networks. Each computer can be implemented as one or more physical computers or as a virtual machine hosted on a physical computer. The distributed computing systems 106, 108 can handle data intensive applications deployed in a virtualized environment. One example distributed computing system is an Infrastructure as a Service (IaaS) cloud server.

Each distributed computing system 106, 108 has an underlying infrastructure that configures, e.g., manages or allocates, computing resources, e.g., physical computers, storages, memories, networks, to provide a virtualized environment for deployment of software packages. Different distributed computing systems may have different underlying infrastructures. In some cases, to deploy a software package on the different distributed computing systems, a user may have to deal with the different underlying infrastructures.

The deployment system 120 includes a software deployment tool 122. The software deployment tool 122 can deploy software packages across different distributed computing systems. One example of a software deployment tool 122 is BOSH, which can be used to deploy Cloud Foundry® and other distributed services on IaaS providers, e.g., on VMWARE VSPHERE®, vCloud Director®, Amazon Web Services® (AWS®), or OpenStack®.

The software deployment tool 122 can access, e.g., through an interface such as cloud provider interface (CPI) for BOSH, computing resources in a distributed computing system. The software deployment tool 122 can configure computing resources of the distributed computing system, to provide, for a software package, a secure and exclusive virtual computing environment for software installation and configuration. The environment can include one or more virtual machines (VMs) and one or more layers of a software architecture, e.g., from a storage layer to a user interface layer.

A set of custom files for the software package can be prepared before deployment. The software deployment tool 122 can be used to deploy the software package on a distributed computing system based on the set of custom files. In some implementations, the set of custom files includes a custom specification, a custom template, and/or a custom manifest. The custom specification can include detailed information on the software package. The custom manifest can define settings for deployment of the software package. In some cases, the custom specification and the custom manifest are included in one specification file. The custom template can include a plurality of generalized configuration parameters for installing the software package.

As noted above, in some implementations, the software deployment tool is BOSH. BOSH can deploy a software package based on a BOSH specification, a BOSH manifest, and a BOSH template. The BOSH specification may include template files, package dependencies, and properties for a set of deployment and execution rules and resources. The BOSH manifest can define deployment settings for a software instance, e.g., a Cloud Foundry instance. The deployment settings may include VMs to be created, persistent disks to be attached to each VM, networks and IP addresses to be bound to each VM, templates from the BOSH release to be applied to each VM, and custom properties to be applied to configuration files and scripts for each template. The BOSH template can include a plurality of generalized configuration parameters and scripts for the software package.

In some implementations, a preparation system, e.g., the preparation system 110, is used by a user to prepare the set of custom files, e.g., a custom specification, a custom template, and/or a custom manifest, for the software package. In some cases, a user may manually write the custom specification. In some cases, as described in further detail below, the preparation system prepares the custom specification based on a standard specification for the software package. In such cases, the standard specification is required. The preparation system 110 can automatically prepare the custom specification from the standard specification. For example, the preparation system 110 can receive a request from a user to prepare a software package for deployment and automatically complete the preparation without any additional input from the user.

After preparation of the set of custom files for the software package, the preparation system 110 can send the prepared custom files to the deployment system 120 for deployment of the software package. In some implementations, the preparation system 110 is provided on a personal computer, e.g., the user computer 104. In some implementations, the preparation system 110 is provided on a server system connected to the user computer 104 through the network 130. In some implementations, the preparation system 110 and the deployment system 120 are provided on a same server system.

In some implementations, the preparation system 110 includes a converter 112. The converter 112 converts a standard specification for a software package into a custom specification for a software deployment tool that deploys the software package based on the custom specification. In some implementations, the preparation system 110 includes a differentiator 114. As described in further detail below, the differentiator 114 can determine differences between specific source files specifying configuration information for the software package and respective configuration files specifying the configuration information. The differentiator 114 can write the differences into a custom template and a custom specification for the software deployment tool 122.

Figure 2:
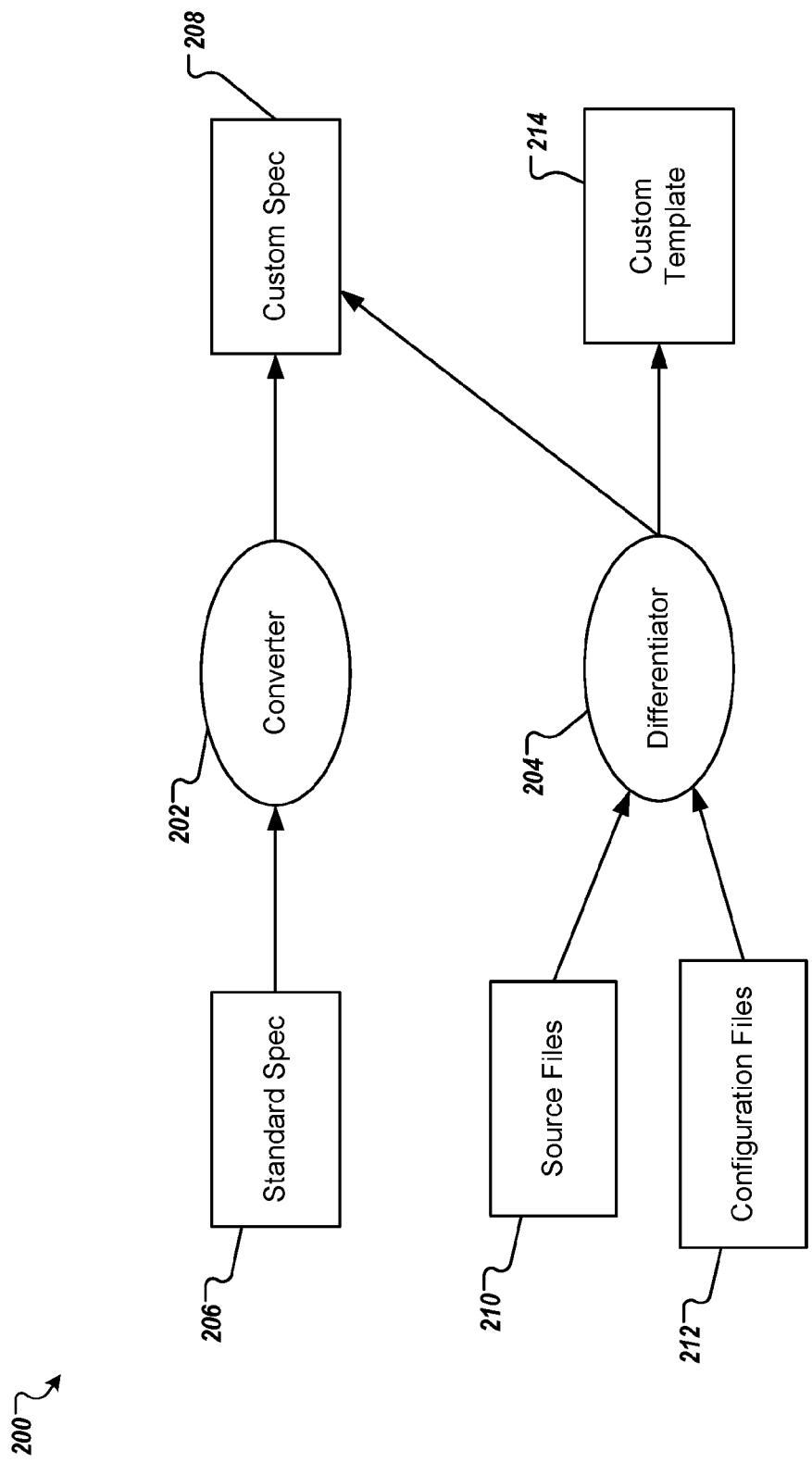
FIG. 2 is a block diagram of an example preparation system for preparing software packages for deployment.

FIG. 2 is a block diagram of an example preparation system 200 that prepares a software package to be deployed by a software deployment tool. The software deployment tool can be the software deployment tool 122 of the deployment system 120 of FIG. 1. The preparation system 200 can include a converter 202 and a differentiator 204. The preparation system 200, the converter 202, and the differentiator 204 can be the preparation system 110, the converter 112, and the differentiator 114 of FIG. 1, respectively.

The converter 202 converts a standard specification 206 for a software package into a custom specification 208 for a software deployment tool. The converter 202 can receive a request from a user to convert the standard specification 206 for the software package. The standard specification 206 may be stored in a user computer of the user or uploaded to a server that includes the preparation system 200. The preparation system 200, e.g., the converter 202, can locate the standard specification 206 based on the request and convert the standard specification into the custom specification 208 without any additional input from the user.

The preparation system 200 can determine whether the standard specification for the software package is available, e.g., by searching in the software package. If the standard specification is not available, the preparation system 200 may prompt the user to get the standard specification before using the preparation system 200.

The standard specification 206 can include a plurality of standard parameters for installing the software package. The standard specification 206 can also include associated information for the standard parameters. The custom specification 208 may include a plurality of custom parameters corresponding to the plurality of standard parameters of the standard specification. The standard specification may have a standard format for the plurality of standard parameters. The custom specification can have a custom format for the plurality of custom parameters. The custom format may be different from the standard format.

The converter 202 can perform operations, e.g., in sequence, including: accessing the standard specification 206, parsing the standard specification 206 to determine a plurality of standard parameters and associated information in the standard specification 206, and writing the determined standard parameters and associated information into the custom specification 208 according to the custom format. The operations may be automatically performed by the converter 202.

In a particular example, the standard specification 206 includes a RPM specification "redis.spec" file. The redis.spec file can be used to install a software "redis" on a Linux® operating system. The redis.spec file may be as follows:

```
%define pid_dir %{_localstatedir}/run/redis
%define pid_file %{pid_dir}/redis.pid
Summary: redis
Name: redis
Version: 2.6.14
Release: 03_r7
License: BSD
Group: Networking/Daemons
URL: http://code.google.com/p/redis/
Source0: redis-%{version}.tar.gz
Source1: redis.conf
BuildRoot: %{_tmppath}/%{name}-%{version}-%{release}-root
BuildRequires: gcc, make
Requires(post): /sbin/chkconfig /usr/sbin/useradd
Requires(preun): /sbin/chkconfig, /sbin/service
Requires(postun): /sbin/service
Provides: redis
Packager: Herbert G. Fischer <hgfischer@sp.r7.com>
%description
```

Redis is a key-value database. It is similar to memcached but the dataset is not volatile, and values can be strings, exactly like in memcached, but also lists and sets with atomic operations to push/pop elements.

```
%package doc
Group: Networking/Daemons
Summary: Redis'docs
Requires: %{name} = %{epoch}:%{version}-%{release}
%description doc
Redis HTML documentation
%prep
%setup
%build
%{_make}
%install
make PREFIX=%{buildroot}% install
...
```

The converter 202 can convert the RPM specification "redis.spec" file into a custom specification, e.g., a BOSH specification, for a software deployment tool, e.g., BOSH. The converter 202 can access the redis.spec file and parse the redis.spec file to determine a plurality of standard parameters, e.g., "Name," "Version," "Source0," and associated information, e.g., "redis" for "Name," "2.6.14" for "Version," "redis-%{version}.tar.gz" for "Source0." Then the converter 202 can write the determined parameters and associated information into the custom specification, according to a custom format. The custom specification can be as follows:

```
name: redis
dependencies:
files:
 - redis/redis-2.6.14.tar.gz
```

The custom specification may have custom parameters different from the standard parameters in the standard specification. For example, the BOSH specification includes a parameter "files" that is different from "Source0" in the redis.spec file. Associated information for the custom parameter "files" is "-redis/redis-2.6.14.tar.gz," which is based on the association information for "Source0" and "Version" in the redis.spec file.

The converter 202 can also prepare a custom manifest, e.g., a BOSH manifest, from the standard specification. For example, the converter 202 can parse the standard specification to determine macros or scripts and associated information, and then write the determined macros or scripts and associated information into the custom manifest according to a custom format. The custom manifest can be as follows:

```
set
    -e # exit immediately if a simple command exits
with a non-zero status set
    -u # report the usage of uninitialized variables set
    -x
# Available variables
# $BOSH_COMPILE_TARGET - where this package &
spec'd source files are available
# $BOSH_INSTALL_TARGET - where you copy/install
files to be included in package
tar xvf redis/redis-2.6.14.tar.gz
cd redis-2.6.14
make PREFIX=${BOSH_INSTALL_TARGET} install
```

The converter 202 determines RPM scripts "% setup" and "% install" and associated information in the redis.spec file and writes them into corresponding scripts for the custom manifest based on a custom format. For example, "% setup" corresponds to "tar xvf redis/redis-2.6.14.tar.gz cd redis-2.6.14" in the custom manifest, and "% install make PREFIX=%{buildroot}% install" corresponds to "make PREFIX=${BOSH_INSTALL TARGET}install" in the custom manifest.

As noted above, when the software package is installed on a computing system, a plurality of source files 210 specifying configuration information for installing the software package may be converted into a plurality of respective configuration files 212. The configuration files may specify the configuration information and include a plurality of configuration parameters and associated custom values.

In some implementations, the software package is designed to be installed on a computing system running a particular operating system. The software package is to be deployed on a distributed computing system that provides the particular operating system. Before deployment, the software package is installed, e.g., by a user, on a computing system running the particular operating system, e.g., in a user computer or a server. After installation, a plurality of source files for the software package is converted into respective configuration files. The respective configuration files may be stored in the user computer or the server. In some cases, the plurality of source files can be distributed together with the software package and stored in the user computer or the server. In some cases, the plurality of source files may be stored in a repository that is located in a computer or a server different from the user computer or the server.

To prepare the software package for deployment on the distributed computing system, the preparation system 200, e.g., the differentiator 204, may first identify locations of the plurality of source files 210 and the plurality of respective configuration files 212. The preparation system 200 can determine whether the plurality of respective configuration files for the software package is available, e.g., by searching a specific file or folder representative for the configuration files in the user computer or the server. If the plurality of respective configuration files is determined not to be available, the preparation system 200 may prompt the user to first install the software package on a computing system running the particular operating system to get the configuration files corresponding to the source files before using the preparation system 200. In some cases, the preparation system 200 can identify the locations of the source files and respective configuration files without user input. In some other cases, the preparation system 200 may receive user input to identify the locations.

After identifying the locations of the plurality of source files 210 and the plurality of respective configuration files 212, the differentiator 204 determines a difference between each source file and its respective configuration file. For example, the differentiator 204 can parse the source file and the respective configuration file to determine the configuration parameters and the custom values for the configuration parameters.

The differentiator 204 can write the determined configuration parameters and custom values into a custom template. The differentiator 204 may generate, e.g., automatically, the custom template based on the determined differences between the plurality of source files and the plurality of respective configuration files. For example, the differentiator 204 can generate a blank text file as the custom template, parse, e.g., one by one, a source file and its respective configuration file to determine one or more configuration parameters and one or more custom values for the configuration parameters, and update the custom template with the determined configuration parameters. The differentiator 204 can further provide the determined custom values to the custom specification 208 that is prepared by the converter 202. The custom specification 208 can be updated with the determined custom values by the preparation system 200, e.g., the differentiator 204.

In some implementations, the custom specification 208 includes a specification file and a manifest file. The specification file and the manifest file can be obtained by using the converter 202 and the standard specification 206. The differentiator 204 can provide the determined custom values to the manifest file.

In a particular example, a software package includes a user.conf.xml file specifying configuration information on users. The source file may contain a header but no users, as follows:

```
<users>
</users>
```

When the software package is installed on a computing system, the source file is copied to an installation directory, e.g., /opt/demoapp/etc/user.conf.xml. The computing system may execute a configuration program to generate configuration parameters, e.g., name and password, based on the configuration information, e.g., users. The computing system can present the configuration parameters, e.g., in a form of questions or forms, for soliciting custom values for the configuration parameters. A user who installs the software package can provide a name, e.g., tom, and a password, e.g., tom123, to the computing system. The computing system writes the configuration parameters, e.g., name and password, and the received custom values, e.g., tom and tom123, into the copied source file to obtain a configuration file on the computing system. The configuration file may be as follows:

```
<users>
  <user>
    <name> tom </name>
    <password> tom123 </password>
  </user>
</user>
```

The differentiator compares the source file and the configuration file, e.g., two versions of user.conf.xml, and determines that a user name and a password are required to configure the product, that the configuration parameters are name and password, and that the custom values are tom for name and tom123 for password.

The differentiator can prepare a custom template, e.g., user.conferb file, to include the determined configuration parameters. The custom template may be as follows:

```
<users>
  <user>
    <name><%=p("demo.user.name") %></name>
    <password> <%=p("demo.user.password") %></password>
  </user>
</user>
```

The differentiator can prepare a custom manifest to include the custom values for the configuration parameters, as follows:

```
properties:
  demon:
    user:
      name: tom
      password: tom123
```

The differentiator can update a custom specification with information on the custom template and the custom manifest, as follows:

```
templates:
  user.conf.erb: etc/user.conf.xml
properties:
  demon.user.name:
    description:
    default:
  demon.user.password:
    description:
    default:
```

After preparation, the preparation system 200 can provide the updated custom specification 208 and the custom template 214 to the deployment system. The deployment system can deploy, using the software deployment tool, the software package on one or more distributed computing systems based on the updated custom specification 208 and the custom template 214.

During deployment, the software deployment tool can perform operations, e.g., sequentially, including: copying the source files to a distributed computing system, identifying the configuration parameters in the custom template 214, determining the custom values for the configuration parameters in the updated custom specification 208, and writing the identified configuration parameters and determined custom values into the copied source files to obtain new configuration files on the distributed computing system. The operations may be performed automatically by the software deployment tool.

In some implementations, the standard specification 206 is a RPM specification for a software package. The software deployment tool is BOSH. The converter 202 of the preparation system 200 converts the RPM specification into a BOSH specification and a BOSH manifest. The differentiator 204 of the preparation system 200 compares the source files 210 of the software package and the configuration files 212, prepares a BOSH template, and provides determined custom values to the BOSH manifest. Based on the BOSH specification, BOSH manifest and the BOSH template, BOSH can deploy the software package on an IaaS provider.

Figure 3A:
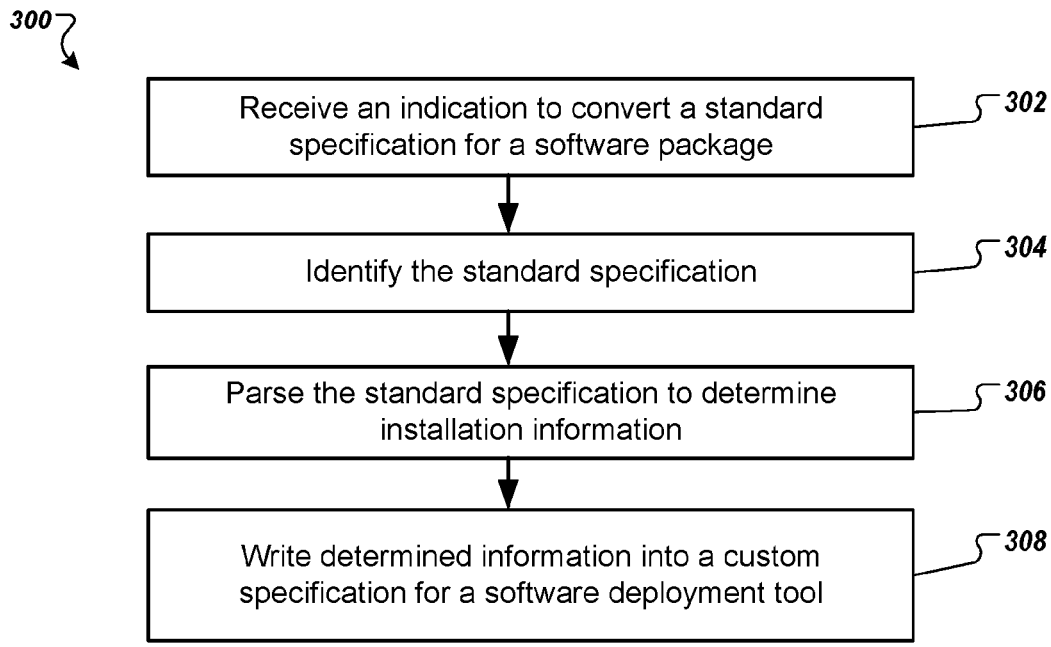
FIGS. 3A and 3B are flow charts of example processes performed by the preparation system of FIG. 2.

FIG. 3A is a flow chart of an example process 300 performed by a converter of a preparation system. The preparation system can be the preparation system 200 of FIG. 2. The converter can be the converter 202 of FIG. 2.

The converter receives an indication to convert a standard specification for a software package (302). The standard specification specifies installation information for the software package, e.g., a plurality of parameters and associated values for the parameters. The standard specification has a standard format for the plurality of parameters.

The converter identifies the standard specification for the software package (304). The converter can identify a location of the standard specification based on the received indication without any additional input from the user. The converter can also identify the location of the standard specification with user input.

The converter parses the standard specification to determine installation information (306). The converter can access the standard specification and parse the standard specification to determine the plurality of parameters and associated values.

The converter writes some or all of the determined information into a custom specification for a software deployment tool (308). The converter may generate a blank text file or XML file as the custom specification and write the determined standard parameters and associated values into the custom specification. In some cases, the custom specification has associated custom format different from the standard format. The converter can write the standard parameters and associated values into the custom specification according to the custom format.

Figure 3B:
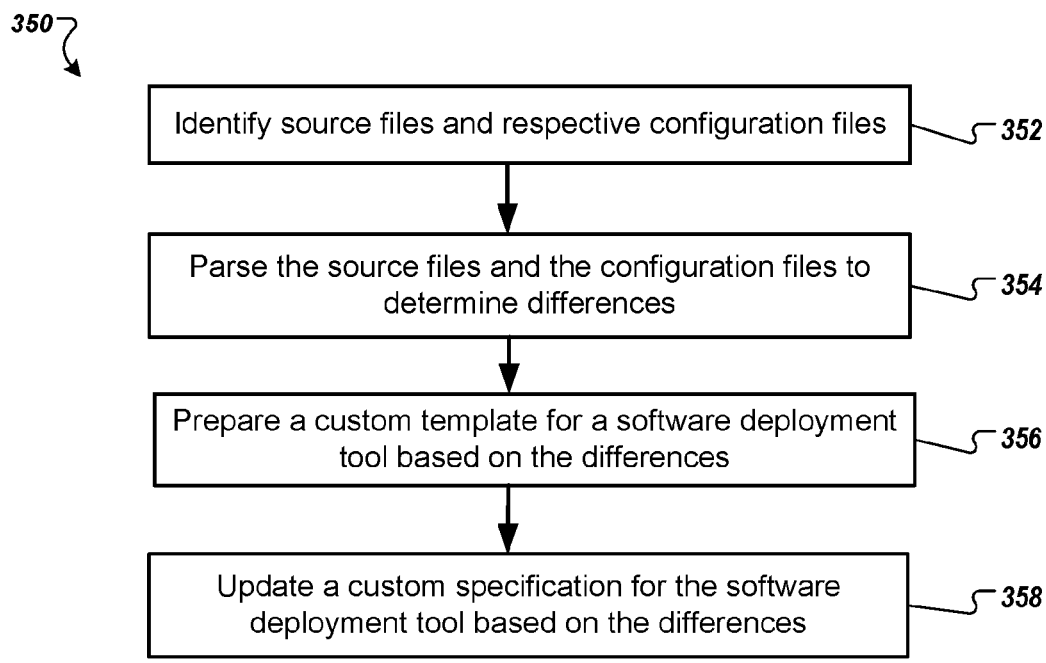

FIG. 3B is a flow chart of an example process 350 performed by a differentiator of a preparation system. The preparation system can be the preparation system 200 of FIG. 2 or the preparation system of FIG. 3A. The differentiator can be the differentiator 204 of FIG. 2.

The differentiator identifies source files for a software package and respective configuration files (352). The source files specify configuration information for installing the software package during a configuration step. Before deployment, the software package is first installed, e.g., in a user computer or a server. After installation and configuration, a plurality of source files is converted into the respective configuration files. The configuration files specify the configuration information and include configuration parameters and custom values for the configuration parameters. The configuration files are stored in the user computer or the server. In some cases, the source files are stored in the user computer or the server. In some cases, the source files are stored in a repository that is located in a computer or a server different from the user computer or the server.

The differentiator can determine whether the locations of the source files and the configuration files are available. In some cases, the differentiator determines that the location of the source files and/or the location of the configuration files are not available. The differentiator can prompt a notification for soliciting user input to identify the locations. In some cases, the differentiator determines that there is no configuration file, and the differentiator may prompt a notification that indicates to install the software package to get the configuration files before using the differentiator or the preparation system.

The differentiator parses each source file and its respective configuration file to determine a difference between the source file and the respective configuration file (354). The difference can include one or more configuration parameters included in the configuration file and one or more custom values for the one or more configuration parameters.

The differentiator prepares a custom template for a software deployment tool based on the differences (356). The software deployment tool can be the software deployment tool in FIG. 3A. The differentiator may generate a blank text file as the custom template and write the determined configuration parameters into the custom template.

The differentiator updates a custom specification for the software deployment tool based on the differences (358). The custom specification can be prepared by a converter, e.g., the converter of the preparation system of FIG. 3A. The differentiator may send the custom values and/or information on the custom template to the custom specification. The custom specification can be updated with the custom values and/or the information associated with the custom template. In some implementations, the custom specification includes a specification file and a manifest file. The custom values can be written into the manifest file.

Figure 4:
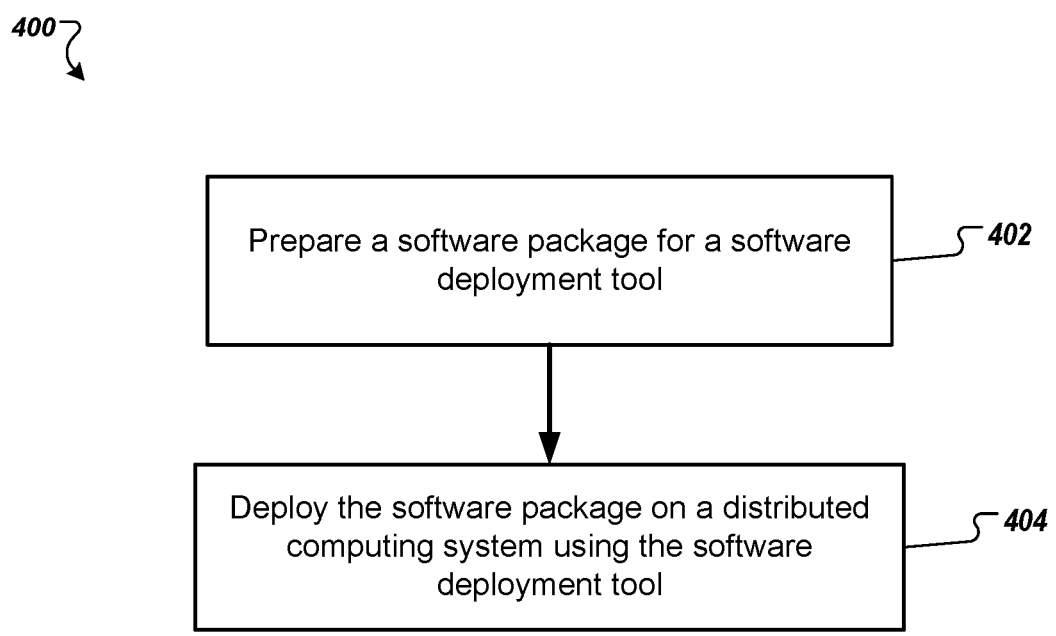
FIG. 4 is a flow chart of an example process performed by the system of FIG. 1.

FIG. 4 is a flow chart of an example process 400 performed by a system. The system can be the system 100 of FIG. 1. The system can include a preparation system and a deployment system. The preparation system can be the preparation system 110 of FIG. 1, the preparation system 200 of FIG. 2, or the preparation system of FIGS. 3A and 3B. The deployment system can be the deployment system 120 of FIG. 1. The deployment system can include a software deployment tool, e.g., the software deployment tool 122 of FIG. 1.

The preparation system prepares a software package for the software deployment tool (402). The preparation system can receive a request from a user to prepare the software package for deployment, and automatically or semi-automatically prepare the software package without any additional input from the user.

The preparation system prepares a set of custom files, e.g., a custom specification and a custom template, for the software package to be deployed in one or more distributed computing systems. As described in detail above, the preparation system can obtain the custom specification from a standard specification for the software package by using a converter, the converter 112 of FIG. 1, 202 of FIG. 2, or the converter of FIG. 3A.

The software package can be first installed on a user computer or a server. The software package includes source files specifying configuration information. After installation and configuration, respective configuration files are obtained based on the source files. The preparation system can use a differentiator, e.g., the differentiator 114 of FIG. 1, 204 of FIG. 2, or the differentiator of FIG. 3B, to determine differences between the source files and the respective configuration files. The differences include the configuration parameters and custom values for the configuration parameters. The preparation system can prepare the custom template with the determined configuration parameters. The preparation system can update the custom specification with the custom values for the configuration parameters and information on the custom template.

After the preparation system prepares the software package, the deployment system deploys the software package on a distributed computing system using the software deployment tool (404). As described in detail above, the deployment system can use the software deployment tool to deploy the software package based on the updated custom specification and the custom template. The deployment system can copy the source files to the distributed computing system, identify the configuration parameters in the custom template, determine the custom values for the configuration parameters in the updated custom specification, and write the configuration parameters and the custom values into the copied source files to obtain new configuration files on the distributed computing system. In some cases, the deployment system deploys the software package to two or more different distributed computing systems with different underlying architectures based on the updated custom specification and the custom template.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method comprising:
   obtaining, by a data processing system comprising one or more computers, a standard specification for a software package, the standard specification specifying a plurality of parameters for installing the software package, the software package comprising one or more source files specifying configuration information for installing the software package;
   converting, by the data processing system, the standard specification into a custom specification for a software deployment tool for deploying the software package on one or more distributed computing systems;
   installing, by the data processing system, an instance of the software package on a particular computing system running a particular operating system, wherein the particular operating system is the same as an operating system provided by one of the distributed computing systems where the software package is to be deployed;
   identifying the previously installed instance of the software package installed on the particular operating system;
   obtaining a configuration file for the previously installed instance of the software package;
   obtaining a source file from which the configuration file was generated when the previously installed instance of the software package was installed;
   computing respective differences between the configuration file for the previously installed instance of the software package and the source file from which the configuration file was generated;
   generating custom configuration parameters for the software package using the computed differences between the configuration file for the previously installed instance of the software package and the source file from which the configuration file was generated;
   writing, by the data processing system, the determined custom configuration parameters into a custom template; and
   updating, by the data processing system, the custom specification with the determined custom values for the custom configuration parameters and information associated with the custom template.

2. The method of claim 1, further comprising:
   receiving, for a specific custom configuration parameter of the custom configuration parameters in a specific configuration file of the respective configuration files, a specific custom value from a user; and
   writing, by the data processing system, the specific custom value for the specific custom configuration parameter into the specific configuration file.

3. The method of claim 1, wherein the standard specification has an associated standard format, and the custom specification has an associated custom format different from the standard format.

4. The method of claim 3, wherein converting the standard specification into a custom specification comprises:
   parsing the standard specification to determine the plurality of parameters and associated information; and
   writing the determined parameters and associated information into the custom specification according to the custom format.

5. The method of claim 1, further comprising:
   receiving a request from a user to convert the standard specification into the custom specification for the software deployment tool,
   wherein converting the standard specification into the custom specification comprises converting the standard specification into the custom specification without any additional input from the user.

6. The method of claim 1, further comprising:
   deploying, by the data processing system, the software package on one of the distributed computing systems based on the custom template and the updated custom specification.

7. The method of claim 6, wherein deploying the software package on one of the distributed computing systems comprises:
   copying the source files to the one of the distributed computing systems;
   identifying the custom configuration parameters in the custom template;
   determining the custom values for the custom configuration parameters in the updated custom specification; and
   writing the identified custom configuration parameters and the determined custom values into the copied source files to obtain new configuration files on the one of the distributed computing systems.

8. The method of claim 7, wherein deploying the software package on one of the distributed computing systems comprises configuring computing resources of the one of the distributed computing systems based on the updated custom specification.

9. The method of claim 1, wherein the software deployment tool is configured to deploy software packages on a plurality of different distributed computing systems, each of the different distributed computing systems comprising a plurality of computers and providing a respective underlying infrastructure.

10. The method of claim 1, wherein the standard specification is a Red Hat Package Manager (RPM) specification file, the custom specification comprises a BOSH specification file, and the software deployment tool is BOSH.

11. A system comprising:
    one or more computers and one or more storage devices storing instructions that are operable, when executed by the one or more computers, to cause the one or more computers to perform operations comprising:

obtaining a standard specification for a software package, the standard specification specifying a plurality of parameters for installing the software package, the software package comprising one or more source files specifying configuration information for installing the software package;

converting the standard specification into a custom specification for a software deployment tool for deploying the software package on one or more distributed computing systems;

installing a first instance of the software package on a particular computing system running a particular operating system, wherein the particular operating system is the same as an operating system provided by one of the distributed computing systems where the software package is to be deployed;

identifying the previously installed instance of the software package installed on the particular operating system;

obtaining a configuration file for the previously installed instance of the software package;

obtaining a source file from which the configuration file was generated when the previously installed instance of the software package was installed;

computing respective differences between the configuration file for the previously installed instance of the software package and the source file from which the configuration file was generated;

generating custom configuration parameters for the software package using the computed differences between the configuration file for the previously installed instance of the software package and the source file from which the configuration file was generated;

writing the determined custom configuration parameters into a custom template; and updating the custom specification with the determined custom values for the custom configuration parameters and information associated with the custom template.

12. The system of claim 11, the operations further comprising:

receiving, for a specific custom configuration parameter of the custom configuration parameters in a specific configuration file of the respective configuration files, a specific custom value from a user; and writing the specific custom value for the specific custom configuration parameter into the specific configuration file.

13. The system of claim 11, wherein the standard specification has an associated standard format, and the custom specification has an associated custom format different from the standard format.

14. The system of claim 13, wherein converting the standard specification into a custom specification comprises:

parsing the standard specification to determine the plurality of parameters and associated information; and writing the determined parameters and associated information into the custom specification according to the custom format.

15. The system of claim 11, the operations further comprising:

receiving a request from a user to convert the standard specification into the custom specification for the software deployment tool, wherein converting the standard specification into the custom specification comprises converting the standard specification into the custom specification without any additional input from the user.

16. The system of claim 11, the operations further comprising:

deploying the software package on one of the distributed computing systems based on the custom template and the updated custom specification.

17. The system of claim 16, wherein deploying the software package on one of the distributed computing systems comprises:

copying the source files to the one of the distributed computing systems;

identifying the custom configuration parameters in the custom template;

determining the custom values for the custom configuration parameters in the updated custom specification; and writing the identified custom configuration parameters and the determined custom values into the copied source files to obtain new configuration files on the one of the distributed computing systems.

18. The system of claim 17, wherein deploying the software package on one of the distributed computing systems comprises configuring computing resources of the one of the distributed computing systems based on the updated custom specification.

19. The system of claim 11, wherein the software deployment tool is configured to deploy software packages on a plurality of different distributed computing systems, each of the different distributed computing systems comprising a plurality of computers and providing a respective underlying infrastructure.

20. The system of claim 11, wherein the standard specification is a Red Hat Package Manager (RPM) specification file, the custom specification comprises a BOSH specification file, and the software deployment tool is BOSH.

21. One or more non-transitory computer storage media encoded with computer program instructions that when executed by one or more computers cause the one or more computers to perform operations comprising:

obtaining a standard specification for a software package, the standard specification specifying a plurality of parameters for installing the software package, the software package comprising one or more source files specifying configuration information for installing the software package;

converting the standard specification into a custom specification for a software deployment tool for deploying the software package on one or more distributed computing systems;

installing a first instance of the software package on a particular computing system running a particular operating system, wherein the particular operating system is the same as an operating system provided by one of the distributed computing systems where the software package is to be deployed;

identifying the previously installed instance of the software package installed on the particular operating system;

obtaining a configuration file for the previously installed instance of the software package;

obtaining a source file from which the configuration file was generated when the previously installed instance of the software package was installed;

computing respective differences between the configuration file for the previously installed instance of the software package and the source file from which the configuration file was generated;
generating custom configuration parameters for the software package using the computed differences between the configuration file for the previously installed instance of the software package and the source file from which the configuration file was generated;
writing the determined custom configuration parameters into a custom template; and
updating the custom specification with the determined custom values for the custom configuration parameters and information associated with the custom template.

22. The one or more non-transitory computer storage media of claim 21, the operations further comprising:
receiving, for a specific custom configuration parameter of the custom configuration parameters in a specific configuration file of the respective configuration files, a specific custom value from a user; and
writing the specific custom value for the specific custom configuration parameter into the specific configuration file.

23. The one or more non-transitory computer storage media of claim 21, wherein the standard specification has an associated standard format, and the custom specification has an associated custom format different from the standard format.

24. The one or more non-transitory computer storage media of claim 23, wherein converting the standard specification into a custom specification comprises:
parsing the standard specification to determine the plurality of parameters and associated information; and
writing the determined parameters and associated information into the custom specification according to the custom format.

25. The one or more non-transitory computer storage media of claim 21, the operations further comprising:
receiving a request from a user to convert the standard specification into the custom specification for the software deployment tool,
wherein converting the standard specification into the custom specification comprises converting the standard specification into the custom specification without any additional input from the user.

26. The one or more non-transitory computer storage media of claim 21, the operations further comprising:
deploying the software package on one of the distributed computing systems based on the custom template and the updated custom specification.

27. The one or more non-transitory computer storage media of claim 26, wherein deploying the software package on one of the distributed computing systems comprises:
copying the source files to the one of the distributed computing systems;
identifying the custom configuration parameters in the custom template;
determining the custom values for the custom configuration parameters in the updated custom specification; and
writing the identified custom configuration parameters and the determined custom values into the copied source files to obtain new configuration files on the one of the distributed computing systems.

28. The one or more non-transitory computer storage media of claim 27, wherein deploying the software package on one of the distributed computing systems comprises configuring computing resources of the one of the distributed computing systems based on the updated custom specification.

29. The one or more non-transitory computer storage media of claim 21, wherein the software deployment tool is configured to deploy software packages on a plurality of different distributed computing systems, each of the different distributed computing systems comprising a plurality of computers and providing a respective underlying infrastructure.

30. The one or more non-transitory computer storage media of claim 21, wherein the standard specification is a Red Hat Package Manager (RPM) specification file, the custom specification comprises a BOSH specification file, and the software deployment tool is BOSH.

* * * * *